US011986688B2

(12) United States Patent
Kwon

(10) Patent No.: US 11,986,688 B2
(45) Date of Patent: May 21, 2024

(54) COBRA AUTOMATIC FIRE EXTINGUISHING DEVICE CAPABLE OF LOADING FIRE EXTINGUISHER

(71) Applicant: Dei Juhng Kwon, Suwon-si (KR)

(72) Inventor: Dei Juhng Kwon, Suwon-si (KR)

( * ) Notice: Subject to any disclaimer, the term of this patent is extended or adjusted under 35 U.S.C. 154(b) by 329 days.

(21) Appl. No.: 17/638,365

(22) PCT Filed: Sep. 2, 2020

(86) PCT No.: PCT/KR2020/011780
§ 371 (c)(1),
(2) Date: Feb. 25, 2022

(87) PCT Pub. No.: WO2021/049810
PCT Pub. Date: Mar. 18, 2021

(65) Prior Publication Data

US 2022/0288433 A1 Sep. 15, 2022

(30) Foreign Application Priority Data

Sep. 9, 2019 (KR) ........................ 10-2019-0111658
Sep. 2, 2020 (KR) ........................ 10-2020-0111618

(51) Int. Cl.
*A62C 13/78* (2006.01)
*A62C 13/64* (2006.01)
(Continued)

(52) U.S. Cl.
CPC .............. *A62C 13/78* (2013.01); *A62C 13/64* (2013.01); *A62C 31/02* (2013.01); *A62C 31/28* (2013.01); *A62C 37/38* (2013.01)

(58) Field of Classification Search
CPC ......... A62C 13/78; A62C 13/64; A62C 31/02; A62C 31/28; A62C 37/38
(Continued)

(56) References Cited

U.S. PATENT DOCUMENTS 1,793,860 A * 2/1931 Macgregor ............ A62C 13/70 169/51
4,418,336 A * 11/1983 Taylor .................. G08B 13/149 169/51
(Continued)

FOREIGN PATENT DOCUMENTS

JP H10-057515 A 3/1998
KR 20-1998-0041735 U 9/1998
(Continued)

*Primary Examiner* — Steven J Ganey
(74) *Attorney, Agent, or Firm* — KORUS Patent, LLC; Seong Il Jeong

(57) ABSTRACT

The present invention relates to a cobra automatic fire extinguishing device capable of loading a fire extinguisher. The cobra automatic fire extinguishing device can automatically spray extinguishing fluid to a location of a fire by mounting a fire extinguisher inside, detecting the location of the fire, and directing the nozzle to the location of the fire. In addition, the cobra automatic fire extinguishing device can be installed economically since it does not require additional cost and time for manufacturing a separate, dedicated fire extinguisher and certification procedure. Furthermore, the cobra automatic fire extinguishing device can effectively extinguish a fire by precisely spraying the extinguishing liquid to the location of the fire, and can prevent conflagration by suppressing the initial fire.

26 Claims, 6 Drawing Sheets

(51) Int. Cl.

| | |
|---|---|
| ***A62C 31/02*** | (2006.01) |
| ***A62C 31/28*** | (2006.01) |
| ***A62C 37/38*** | (2006.01) |

(58) Field of Classification Search

USPC ................................................ 169/30, 51, 76

See application file for complete search history.

(56) References Cited

U.S. PATENT DOCUMENTS

| | | | | |
|---|---|---|---|---|
| 5,153,567 A * | 10/1992 | Chimento | G08B 17/10 169/51 |
| 2006/0283608 A1* | 12/2006 | Hauck | A62C 13/00 169/30 |

FOREIGN PATENT DOCUMENTS

| | | |
|---|---|---|
| KR | 10-1618991 B1 | 5/2016 |
| KR | 10-1691031 B1 | 1/2017 |
| KR | 10-2019-0024856 A | 3/2019 |

* cited by examiner

COBRA AUTOMATIC FIRE EXTINGUISHING DEVICE CAPABLE OF LOADING FIRE EXTINGUISHER

FIELD OF THE INVENTION

The present invention relates to a cobra automatic fire extinguishing device capable of loading a fire extinguisher.

BACKGROUND OF THE INVENTION

In general, fire extinguishers are placed in buildings or vehicles to preparate for a fire.

A fire extinguisher has a cylindrical shape made of metal, and may be divided into a fountain fire extinguisher that uses compressed air, a carbon dioxide fire extinguisher that ejects chemically generated carbon dioxide, a powder fire extinguisher that ejects bicarbonate of soda, and a foam fire extinguisher that ejects air-filled bubbles of carbon dioxide gas.

Typical fire extinguishers installed in buildings or vehicles have a structure in which a fire extinguishing liquid is discharged to the outside through a nozzle when a detonator device inside is ruptured by pulling out a safety pin and pressing a lever.

This conventional fire extinguisher is manually operated in a way that a user directly pulls out the safety pin and presses the lever when a fire occurs.

Accordingly, since the conventional fire extinguisher must be manually operated by a person, it is difficult to use the fire extinguisher against a fire that occurs when no one is in the building, such as at night.

In addition, since a user needs to manually extinguish the fire, holding the fire extinguisher, there is a high risk of an injury accident.

In order to solve this problem, Korean Utility Model Registration No. 0403498 'Automatic Operation Device for Fire Extinguisher' has been proposed.

The Korean Utility Model Registration No. 0403498 'Automatic Operation Device for Fire Extinguisher' has a structure that is mounted on a fire extinguisher and operates the fire extinguisher by automatically pulling a lever when a fire occurs.

However, the Korea Utility Model Registration No. 0403498 'Automatic Operation Device for Fire Extinguisher' does not have a structure for pulling out a safety pin and a function to lift the hose, and thus, it is practically impossible to apply this structure to existing fire extinguishers, which are currently installed in the building.

In addition, since Korean Utility Model Registration No. 0403498 'Automatic Operation Device for Fire Extinguisher' operates the fire extinguisher simply by pulling the lever, and it sprays the extinguishing liquid in just only one direction from a fixed position, there is a limitation in the discharge range of the fire extinguisher.

DETAILED DESCRIPTION OF THE INVENTION

Technical Problems

The object of the present invention is to provide a cobra automatic fire extinguishing device capable of loading a fire extinguisher that can automatically spray extinguishing fluid to the location of a fire by mounting a fire extinguisher thereon.

Another object of the present invention is to provide a cobra automatic fire extinguishing device capable of loading a fire extinguisher that can precisely spray the extinguishing liquid at the location of a fire and can spray over a wide range, by rotating the mounted fire extinguisher or moving a nozzle up and down without rotating the mounted fire extinguisher.

Another object of the present invention is to provide a cobra automatic fire extinguishing device capable of loading a fire extinguisher that can allow a user to manually control the mounted fire extinguisher and spray the extinguishing liquid to the location of a fire.

SUMMARY OF THE INVENTION

A cobra automatic fire extinguishing device capable of loading a fire extinguisher a fire extinguisher according to an embodiment can adjust a nozzle of a mounted fire extinguisher toward a location of a fire to spray extinguishing liquid. The cobra automatic fire extinguishing device comprising: a fire extinguisher housing having an open front and accommodating the fire extinguisher inside; a nozzle fixing part rotatably disposed inside the fire extinguisher housing and clamping the nozzle of the fire extinguisher; a nozzle rotating part disposed inside the fire extinguisher housing and rotating the nozzle fixing part so that the nozzle faces toward the location of the fire; a lever operating part positioned in the fire extinguisher housing and operating the fire extinguisher by pressing a lever of the fire extinguisher; a fire detector positioned in the fire extinguisher housing and detecting the fire, and a control part receiving a fire signal from the fire detector and controlling operations of the nozzle rotating part and the lever operating part.

The nozzle fixing part includes: a side rotating bracket rotatably positioned on an internal side of the fire extinguisher housing and connected to the nozzle rotating part; a nozzle fixing bracket positioned to be bent from an end portion of the side rotating bracket and clamping the nozzle, and a clamping part positioned on the nozzle fixing bracket and fixing the nozzle.

The fire extinguisher housing has a top portion formed with a slit groove into which the side rotating bracket can be inserted, wherein the nozzle fixing bracket is positioned not to block the fire extinguisher when the fire extinguisher is inserted into the fire extinguisher housing through the open front of the fire extinguisher housing, by lifting the side rotating bracket upward to pass through the slit groove and be exposed above the top portion of the fire extinguisher housing.

The clamping part include: a nozzle fitting groove positioned at an end portion of the nozzle fixing bracket and having an open portion at one side, and a groove opening and closing part positioned at the end portion of the nozzle fixing bracket, and opening or closing the open portion of the nozzle fitting groove.

The cobra automatic fire extinguishing device further comprises a fire extinguisher rotating part that rotates the fire extinguisher positioned inside the fire extinguisher housing.

The fire extinguisher rotating part is rotatably positioned on a bottom portion of the fire extinguisher housing, and includes a rotating plate member on which the fire extinguisher is mounted, and a rotating motor rotating the rotating plate member.

The fire extinguisher rotating part further includes a housing support member on which the fire extinguisher housing is rotatably positioned, and the fire extinguisher housing is rotated by the rotating motor.

The fire extinguisher housing can be rotated by the rotating motor.

The rotating plate member includes a ratchet structure that allows the rotating plate member to rotate separately from the fire extinguisher housing when rotating in one of a clockwise direction and a counterclockwise direction, and to rotate integrally with the fire extinguisher housing when rotating in the other one of the clockwise direction and the counterclockwise direction.

The cobra automatic fire extinguishing device further comprises a safety pin removing part that pulls out a safety pin on the fire extinguisher and locks an operation of the lever of the fire extinguisher.

The safety pin removing part includes: a safety pin engaging hook member by which the safety pin is hooked, and a pin moving device removing the safety pin from the fire extinguisher by pulling the safety pin engaging hook member.

The safety pin engaging hook member has a structure that is adjusted in length.

The control part receives information of the location of the fire from the fire detector, controls operations of the safety pin removing part, the nozzle rotating part, the fire extinguisher rotating part, and the lever operating part, and sprays the extinguishing liquid with the nozzle which is in a state of facing toward the location of the fire.

The fire detector the cobra automatic fire extinguishing device includes an infrared camera or a fire detection IoT camera that captures images around the fire extinguisher housing and detects the fire.

The fire detector includes any one fire detection sensor selected from the group of a combustible gas detection sensor, a toxic gas detection sensor, a complex gas concentration measurement sensor, a gas detection measurement sensor, and any one of these combinations thereof.

The cobra automatic fire extinguishing device further comprises: a rail member positioned so that the fire extinguisher housing is movable and installed on at least one of a ceiling, a floor, and a wall of a building, and a housing driving part positioned on the fire extinguisher housing and moving the fire extinguisher housing along the rail member.

The cobra automatic fire extinguishing device further comprising an external fire detection part that is located in a moving route of the fire extinguisher housing in the building to detect the fire.

The control part further includes a wireless communication part that communicates with the external fire detection part and transmits information of the fire to the control part.

The cobra automatic fire extinguishing device further comprises a fire extinguisher fixing jig part that holds and fixes the fire extinguisher positioned inside the fire extinguisher housing.

The fire extinguisher fixing jig part includes: a first jig member and a second jig member respectively positioned on both sides of the fire extinguisher, and a jig moving part moving the first and the second jig member in a direction in which a distance between the first and the second jig member becomes narrow or wide.

Each of the first and the second jig member has a V-shaped groove portion into which a portion of the body of the fire extinguisher is inserted, respectively, wherein buffer pads are respectively positioned on inclined surfaces that forms the V-shaped grooves.

The clamping part includes: a base bracket positioned on an end portion of the nozzle fixing bracket; a hinge fixing bracket positioned to stand upright on the base bracket; a first jig bracket rotatably coupled to the hinge fixing bracket and having a first nozzle insertion groove into which a portion of the nozzle is inserted; a second jig bracket rotatably coupled to the hinge fixing bracket and having a second nozzle insertion groove into which a remaining portion of the nozzle is inserted, and a jig rotating part mounted on the hinge fixing bracket and rotating the first and the second jig bracket to widen or narrow a distance between the first and the second jig bracket.

Each of the first and the second nozzle insertion groove is formed in a semi-circular shape to surround and fix the nozzle having a cone shape, wherein a nozzle buffer member made of elastic material is positioned on an inner surface of each of the first and the second nozzle insertion groove.

The clamping part further includes a nozzle horizontal rotating part that is positioned in the base bracket and rotates the hinge fixing bracket left and right to adjust a spraying direction of the nozzle.

The control part includes a fire alarm lamp part and a fire alarm speaker part that notify the fire to the outside when the fire signal is transmitted from the fire detector.

The control part is connected to a broadcasting system in a building, and when the fire signal is transmitted from the fire detector, the control part outputs an alarm sound or an evacuation announcement voice through the broadcasting system in the building.

The control part further includes an automatic voice reporting function that automatically reports the fire to a manager or a fire department by voice.

Technical Effects of the Invention

According to an embodiment of the present invention, a cobra automatic fire extinguishing device capable of loading a fire extinguisher automatically can spray extinguishing fluid to the location of a fire by mounting a fire extinguisher thereon. In addition, the cobra automatic fire extinguishing device can be installed economically since it does not require additional cost and time for manufacturing a separate, dedicated fire extinguisher and certification procedure.

According to an embodiment of the present invention, a cobra automatic fire extinguishing device capable of loading a fire extinguisher can precisely spray the extinguishing liquid to the location of a fire and sprays over a wide range, by rotating the mounted fire extinguisher or moving a nozzle up and down without rotating the mounted fire extinguisher. Accordingly, the cobra automatic fire extinguishing device can effectively extinguish the fire and prevent conflagration by suppressing the initial fire.

According to an embodiment of the present invention, a user can manually operate the mounted fire extinguisher to spray the extinguishing liquid to the location of the fire, thereby providing user convenience and efficiently suppressing the fire.

According to an embodiment of the present invention, a cobra automatic fire extinguishing device capable of loading a fire extinguisher can quickly detect a fire by a fire occurrence detector including an infrared camera, a fire shape detection IoT camera, and a fire detection sensor. Accordingly, when a fire occurs, the prompt initial response can be carried out, thereby minimizing damage to life and property.

BEST MODE FOR THE INVENTION

Hereinafter, embodiments of the present invention will be described in detail with reference to the accompanying drawings so that one of ordinary skill in the art to which the present invention pertain can easily carry out the present invention.

However, the present invention may be embodied in several different forms and should not be limited to the embodiments described herein. Like reference numbers are used for like parts throughout the specification.

Figure 1:
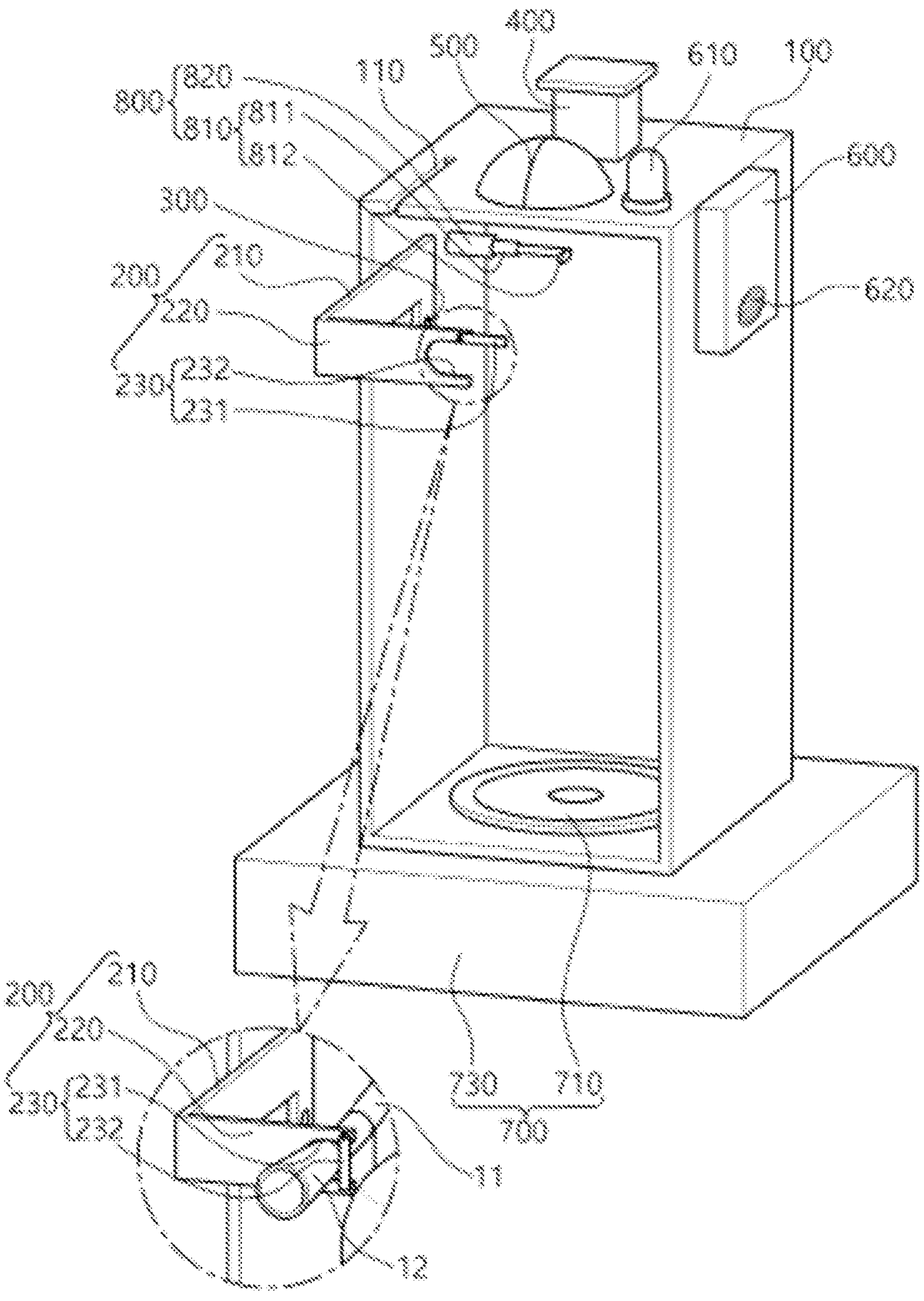
FIG. 1 is a perspective view illustrating a cobra automatic fire extinguishing device capable of loading a fire extinguisher according to an embodiment of the present invention.
Figure 2:
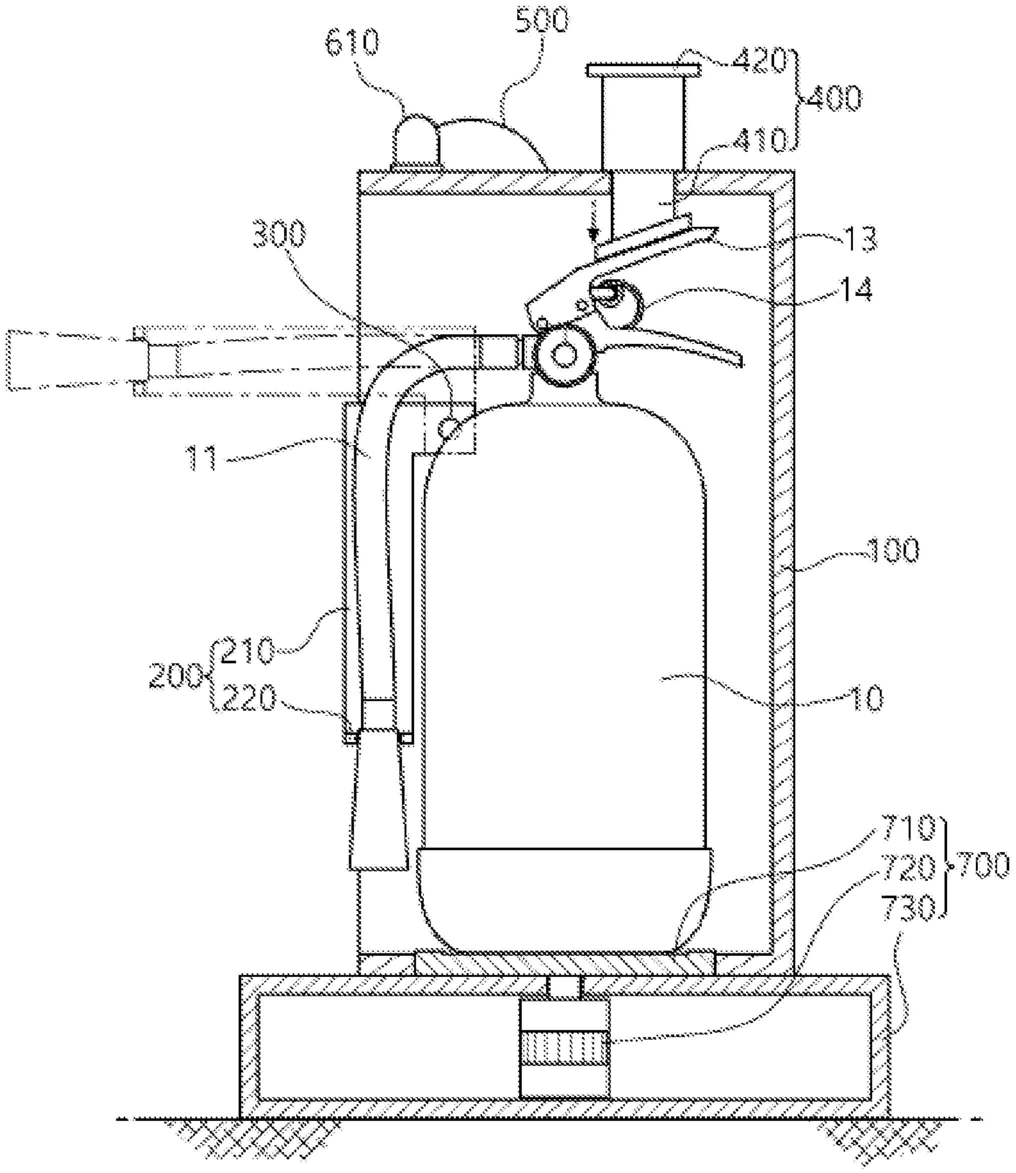
FIG. 2 is a side view illustrating a cobra automatic fire extinguishing device capable of loading a fire extinguisher according to an embodiment of the present invention.

FIG. 1 is a perspective view illustrating a cobra automatic fire extinguishing device capable of loading a fire extinguisher according to an embodiment of the present invention. FIG. 2 is a side view illustrating a cobra automatic fire extinguishing device capable of loading a fire extinguisher according to an embodiment of the present invention.

With reference to FIGS. 1 and 2, a cobra automatic fire extinguishing device capable of loading a fire extinguisher according to an embodiment of the present invention will be described in detail below.

The cobra automatic fire extinguishing device capable of loading a fire extinguisher according to an embodiment of the present invention detects flame, spark, heat, toxic gas, and the like, which are generated during a fire, by an infrared camera, an IOT camera, a toxic gas detection sensor, and other similar devices to automatically operates a fire extinguisher. This is similar to a hunting mechanism of a cobra, which hunts prey by using its internal sensory organs, known as Jacobson's organ, to sensitively detect the body temperature and chemical characteristics of the prey.

The cobra automatic fire extinguishing device capable of loading a fire extinguisher is a device for extinguishing a fire by automatically spraying an extinguishing liquid through a nozzle. Specifically, the device stores the fire extinguisher 10 inside, presses a lever 13 of the fire extinguisher 10 to spray the extinguishing liquid through a nozzle 12 located on an end portion of a flexible hose 11 of the fire extinguisher 10, and controls the nozzle 12 to face the location of the fire.

In this case, since a commercial fire extinguisher contains toxic material which may be harmful to the human body, if the fire extinguisher 10 is required to be operated in a place where there is a person or in a state when a person is present, the fire extinguisher 10 may be a clean fire extinguisher filled with an extinguishing agent harmless to the human body.

The fire extinguisher 10 may be a known fire extinguisher, which includes a safety pin 14 for locking the operation of the lever 13 and is operated by removing the safety pin 14 to press the lever 13. In descriptions below, the fire extinguisher 10 is a known fire extinguisher that sprays the extinguishing liquid through the nozzle 12 located on the end portion of the hose 11 by pressing the lever 13, and the detailed description thereof will be omitted.

The cobra automatic fire extinguishing device capable of loading a fire extinguisher according to an embodiment of the present invention includes a fire extinguisher housing 100 in which the fire extinguisher 10 is accommodated in.

According to one embodiment, as mentioned above, the fire extinguisher 10 accommodated in the fire extinguisher housing 100 may be a known fire extinguisher that sprays the extinguishing liquid through the nozzle 12 located on the end portion of the hose 11 by pressing the lever 13.

The fire extinguisher housing 100 includes a front that opens to the outside and a side at which a nozzle fixing part 200 holding the nozzle 12 of the fire extinguisher 10 is positioned.

The nozzle fixing part 200 is disposed to be rotated upward and downward from the internal side of the fire extinguisher housing 100, and is rotated toward the open front of the fire extinguisher housing 100 by the nozzle rotating part 300.

The nozzle rotating part 300 rotates the nozzle fixing part 200 holding the nozzle 12 to lift the nozzle 12 toward the location of the fire.

The nozzle fixing part 200 includes: a side rotating bracket 210 rotatably mounted on the internal side of the fire extinguisher housing 100; a nozzle fixing bracket 220 positioned to be bent from the end portion of the side rotating bracket 210 and clamping the nozzle 12, and a clamping part 230 positioned on the nozzle fixing bracket 220.

The fire extinguisher housing 100 has a top portion formed with a slit groove 110 into which the side rotating bracket 210 can be inserted. Specifically, when the nozzle fixing part 200 is lifted upward, the side rotating bracket 210 passes through the slit groove 110 and exposed above the top portion of the fire extinguisher housing 100. Therefore, when the fire extinguisher 10 is inserted into the inside through the front of the fire extinguisher housing 100, the fire extinguisher 10 can be inserted without being blocked by the nozzle fixing bracket 220.

In other words, by rotating the side rotating bracket 210 upward and standing vertically, the nozzle fixing part 200 can be positioned not to block or disturb the fire extinguisher 10 when the fire extinguisher 10 is inserted into the fire extinguisher housing 100.

Since the nozzle fixing part 200 is positioned not to block the fire extinguisher 10, it is easy to insert and mount the fire extinguisher 10 into the fire extinguisher housing 100.

In one embodiment, the clamping part 230 may include: a nozzle fitting groove 231 that is positioned at the end portion of the nozzle fixing bracket 220 and has an open portion at one side, and a groove opening and closing part 23 that is positioned at the end portion of the nozzle fixing bracket 220 and that opens and closes the open portion of the nozzle fitting groove 231.

In addition, in one embodiment, the groove opening and closing part 232 is a rotating opening and closing member which is rotatably connected to the nozzle fixing bracket 220.

The rotating opening and closing member may be coupled to a fitting portion of the nozzle fixing bracket 220 by a tight-fitting element, or may be fixed to the nozzle fixing bracket 220 by a set screw.

Since the locking structure of the rotating opening and closing member may be variously modified into a known locking structure capable of unlocking, a more detailed description will be omitted.

Meanwhile, a lever operating part 400 operating the fire extinguisher 10 by pressing the lever 13 of the fire extinguisher 10 is positioned above the fire extinguisher housing 100.

The lever operating part 400 includes a lever pressing member 410 positioned above the lever 13 to press the lever 13 and a lifting device 420 lifting the lever pressing member 410.

The lifting device 420 may be a hydraulic cylinder, but is not limited thereto. Since the lifting device 420 may be variously modified and implemented using a known linear reciprocating device such as a rack pinion structure using a pinion gear rotated by a motor and a rack pinion in gear with the pinion gear, a ball screw type linear actuator, and the like, a more detailed description will be omitted.

Meanwhile, a cobra automatic fire extinguishing device capable of loading a fire extinguisher according to one embodiment of the present invention further comprises a fire extinguisher rotating part 700 that rotates the fire extinguisher 10 positioned inside the fire extinguisher housing 100.

The fire extinguisher rotating part 700 is rotatable and positioned on the bottom portion of the fire extinguisher housing 100, and includes a rotating plate member 710 on which the fire extinguisher 10 is mounted and a rotating motor 720 rotating the rotating plate member 710.

In this case, the fire extinguisher rotating part 700 may further include a housing support member 730 on which the fire extinguisher housing 100 is rotatably positioned, and the fire extinguisher housing 100 can be rotated by the rotating motor 720.

The rotating plate member 710 includes a ratchet structure that allows the rotating plate member 710 to rotate separately from the fire extinguisher housing 100 when rotating in one of the clockwise and counterclockwise direction, and to rotate integrally with the fire extinguisher housing 100 when rotating in the other one of the clockwise and counterclockwise direction.

The fire extinguisher rotating part 700 rotates the fire extinguisher 10 left and right to control the direction of the nozzle 12 of the fire extinguisher 10 in a wider range.

Since the ratchet structure may be variously modified and implemented using a known ratchet structure that allows an element to rotate in one direction and to be stuck in the other direction by a latching structure, a more detailed description will be omitted.

Meanwhile, a cobra automatic fire extinguishing device capable of loading a fire extinguisher according to one embodiment of the present invention further comprises a safety pin removing part 800 that pulls out the safety pin 14 of the fire extinguisher 10.

The safety pin removing part 800 includes: a safety pin engaging hook member 810 by which the safety pin 14 is hooked and a pin moving device 820 removing the safety pin 14 from the fire extinguisher 10 by pulling the safety pin engaging hook member 810.

The pin moving device 820 may be a hydraulic cylinder, but is not limited thereto. Since the pin moving device 820 may be variously modified and implemented using a known linear reciprocating device such as a rack pinion structure using a pinion gear rotated by a motor and a rack pinion in gear with the pinion gear, a ball screw type linear actuator, and the like, a more detailed description will be omitted.

The safety pin engaging hook member 810 may have a structure that can be adjusted in length, and thus, the safety pin 14 can be easily hung thereon depending on the type of the fire extinguisher 10.

The safety pin engaging hook member 810 includes: a fixed rod 811 connected to the pin moving device 820 and a moving hook rod 812 movably inserted into the fixed rod 811 and having a hook, which the safety pin 14 is hooked by, at the end portion.

In one embodiment, the position of the moving hook rod 812 may be fixed with a set screw, and may be fixed with various known locking structures.

The lever 13 of the fire extinguisher 10 is operated by pulling and separating the safety pin 14 with the safety pin removing part 800.

Meanwhile, a fire detector 500 for detecting a fire is positioned in the fire extinguisher housing 100. The fire detector 500 detects the occurrence of a fire, confirms the location of the fire, and transmits the information to a control part 600.

The fire detector 500 includes a camera that captures images, such as videos and images, of the vicinity of the fire extinguisher housing 100 and the detected fire scene, and transmits the images. The camera may include an infrared camera, a fire detection IoT camera, a thermal imaging camera, and a CCD camera.

The fire detection IoT camera is installed in the fire extinguisher housing 100 together with the infrared camera and automatically recognizes the shape of a fire, such as flame, spark, and fumes, generated during a fire as a fire signal, and transmits the fire information to the control part 600. The control part 600 automatically operates the infrared camera for aiming the location of the fire according to the fire extinguishing signal input, and also operates the nozzle rotating part 300, the lever operating part 400, and other parts for directing the nozzle 12 toward the fire.

In addition, the fire detector 500 includes a fire detection sensor capable of detecting smell, smoke, gas, and others in addition to the camera. The fire detection sensor may be composed of a combustible gas detection sensor system and a toxic gas detection sensor that sense smells of gases generated during a fire. In addition, the fire detection sensor may further include a complex gas concentration measurement sensor, a gas detection measurement sensor, and others that can detect various toxic gases when a fire occurs.

Since a fire generates fumes, various toxic gases, combustible gases, flames, sparks, and noise, the fire detection sensor performs a detecting function, which is similar to smelling toxic and combustible gases that occur in the early stage of a fire, and transmits the detected fire signal to the control part 600.

According to the above description, the fire detector 500 includes a camera and a sensor as an example, but is not limited thereto. The fire detector 500 may be embodied with various modifications using a known fire detector capable of detecting a location of a fire.

The control part 600 includes a known hydraulic pressure supply capable of supplying hydraulic pressure to a hydraulic cylinder, or a known power supply capable of supplying electric power to the safety pin removing part 800, the nozzle rotating part 300, the fire extinguisher rotating part 700, and the lever operating part 400. The known power supply may be a rechargeable battery, a plug that can be inserted into a power outlet in a building, a solar cell part, and the like.

The control part 600 includes a fire alarm lamp part 610 and a fire alarm speaker part 620 that notify a fire to the outside when the fire signal is transmitted from the fire detector 500.

When the fire signal is transmitted from the fire detection detector 500, the control part 600 outputs an alarm sound or an evacuation announcement voice, such as "A fire has occurred. Evacuate immediately," through the fire alarm speaker part 620, so that people in the building can evacuate safely.

In addition, the control part 600 may be connected to a broadcasting system in a building. When the fire signal is transmitted from the fire detector 500, the control part 600 outputs an alarm sound or an evacuation announcement voice, such as "A fire has occurred. Evacuate immediately," through the broadcasting system in the building, so that people in the building can evacuate safely.

Furthermore, the control part 600 may include an automatic voice reporting function automatically reporting a fire to a manager, such as a building owner or a building manager, and a fire department by voice. When the fire signal is transmitted from the fire detection detector 500, the control part 600 automatically signals the fire occurrence to the manager, such as a building owner or a building manager, and the fire department and notifies the address of the building by voice.

The control part 600 receives information of the location of the fire from the fire detector 500, controls operations of the safety pin removing part 800, the nozzle rotating part 300, the fire extinguisher rotating part 700, and the lever operating part 400, and sprays the extinguishing liquid with the nozzle 12 which is in a state of facing toward the location of the fire.

Specifically, when the fire detector 500 detects a fire, the fire extinguisher rotating part 700 rotates the fire extinguisher 10 toward the direction of the fire location. Then, the safety pin removing part 800 removes the safety pin 14, and at the same time, the nozzle rotating part 300 is operated to direct the nozzle 12 toward the direction of the fire location.

Then, with the safety pin 14 removed and the nozzle 12 directed toward the direction of the fire location, the lever operating part 400 descends and presses the lever 13 to spray the extinguishing liquid through the nozzle 12, thereby automatically suppressing the fire.

Figure 3:
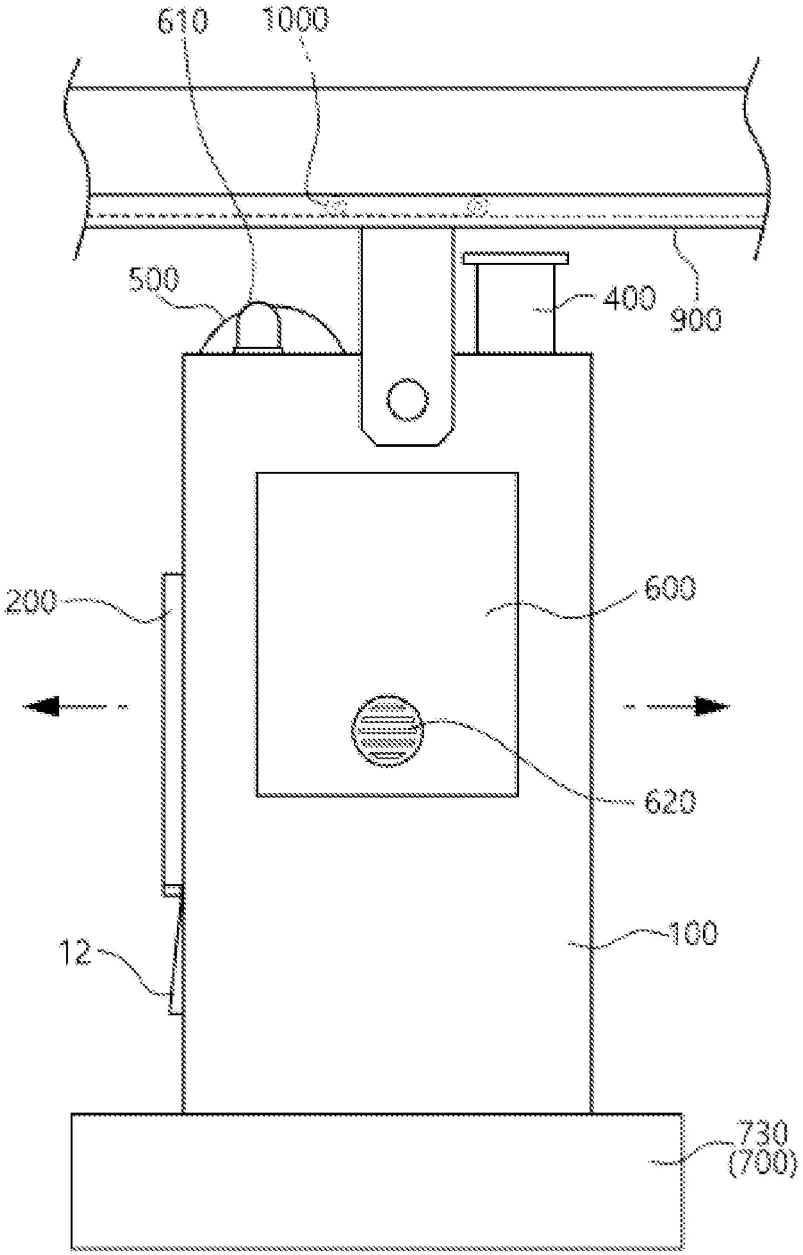
FIGS. 3 and 4 are schematic drawings illustrating a cobra automatic fire extinguishing device capable of loading a fire extinguisher according to another embodiment of the present invention.
Figure 4:
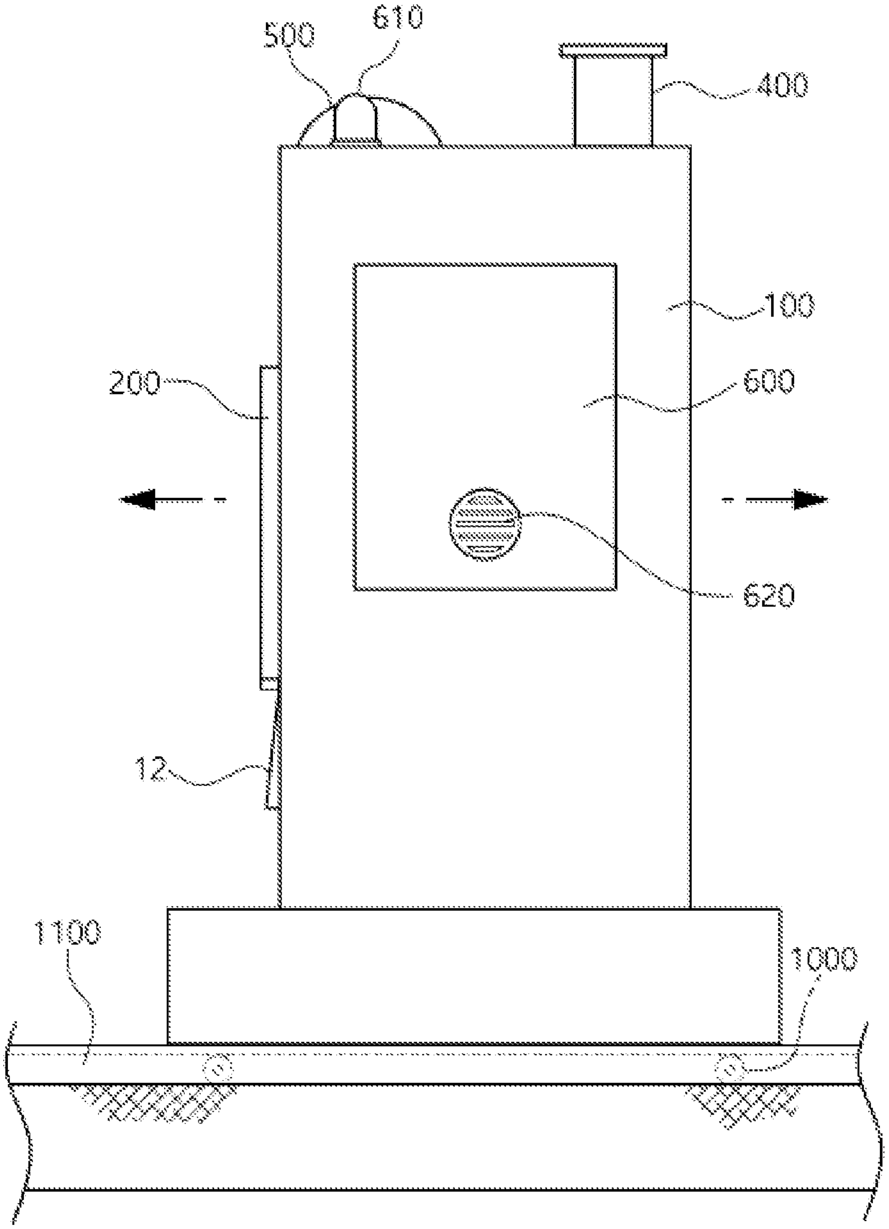

FIGS. 3 and 4 are schematic drawings illustrating a cobra automatic fire extinguishing device capable of loading a fire extinguisher according to another embodiment of the present invention. FIG. 3 illustrates an example in which the fire extinguisher housing 100 moves along a ceiling rail member 900 installed on the ceiling. FIG. 4 illustrates the fire extinguisher housing 100 moving along a floor rail member 1000 installed on the floor.

Referring to FIG. 3, a cobra automatic fire extinguishing device capable of loading a fire extinguisher according to another embodiment of the present invention further comprises: the ceiling rail member 900 positioned so that the fire extinguisher housing 100 is movable and installed on the ceiling, and a housing driving part 1000 positioned on the fire extinguisher housing 100 and moving the fire extinguisher housing 100 along the ceiling rail member 900.

Referring to FIG. 4, a cobra automatic fire extinguishing device capable of loading a fire extinguisher according to another embodiment of the present invention further comprises: the floor rail member 1100 positioned so that the fire extinguisher housing 100 is movable and installed on the floor, and a housing driving part 1000 positioned on the fire extinguisher housing 100 and moving the fire extinguisher housing 100 along the floor rail member 1100.

The housing driving part 1000 includes a driving wheel that rolls in contact with the ceiling rail member 900 or the floor rail member 1100 and a driving motor that rotates the driving wheel. In addition to those members, the housing driving part 1000 may be variously modified by using a known driving structure capable of driving the fire extinguisher housing 100 along the ceiling rail member 900 or the floor rail member 1100.

In addition, although not shown, a cobra automatic fire extinguishing device capable of loading a fire extinguisher according to another embodiment of the present invention further comprises a wall rail member (not shown) installed on the wall, and moves along the wall rail member using the housing running part 1000.

In this case, the wall rail member may be installed vertically or horizontally.

A cobra automatic fire extinguishing device capable of loading a fire extinguisher according to another embodiment of the present invention can monitor the occurrence of a fire while periodically, repeatedly moving along the ceiling rail member 900, the floor rail member 1100, or the wall rail member (not shown). When the cobra automatic fire extinguishing device detects a fire while moving, it stops the movements and suppresses the fire by removing the safety pin 14 of the fire extinguisher 10 with the safety pin removing part 800, lifting the nozzle 12 toward the location of the fire with the nozzle rotating part 300, and then spraying the extinguishing liquid through the nozzle 12 by pressing the lever 13 with the lever operating part 400.

In addition, the cobra automatic fire extinguishing device capable of loading a fire extinguisher according to another embodiment of the present invention further comprises an external fire detection part (not shown) that is in the moving route of the fire extinguisher housing 100 in the building to detect the occurrence of a fire. Furthermore, the control part 600 further includes a wireless communication part that wirelessly communicates with the external fire detection part and transmits the information of the fire to the control part 600.

A plurality of external fire detection parts is spaced apart from each other and positioned on the moving route of the fire extinguisher housing 100 moving through the ceiling rail member 900, the floor rail member 1100, or the wall rail member (not shown). In this case, the external fire detection part may be an infrared camera.

A plurality of external fire detection parts spaced apart from each other on the moving route of the fire extinguisher housing 100 respectively detect the occurrence of a fire by capturing images of the surroundings.

Meanwhile, according to a cobra automatic fire extinguishing device capable of loading a fire extinguisher of another embodiment of the present invention, when a fire is detected by any one of the plurality of external fire detection parts, the fire extinguisher housing 100 moves to a position where the fire is detected along the ceiling rail member 900, the floor rail member 1100, or the wall rail member (not shown).

Then, the cobra automatic fire extinguishing device suppresses the fire by removing the safety pin 14 of the fire extinguisher 10, lifting the nozzle 12 toward the location of the fire, and then spraying the extinguishing liquid by pressing the lever 13 with the lever operating part 400.

Figure 5:
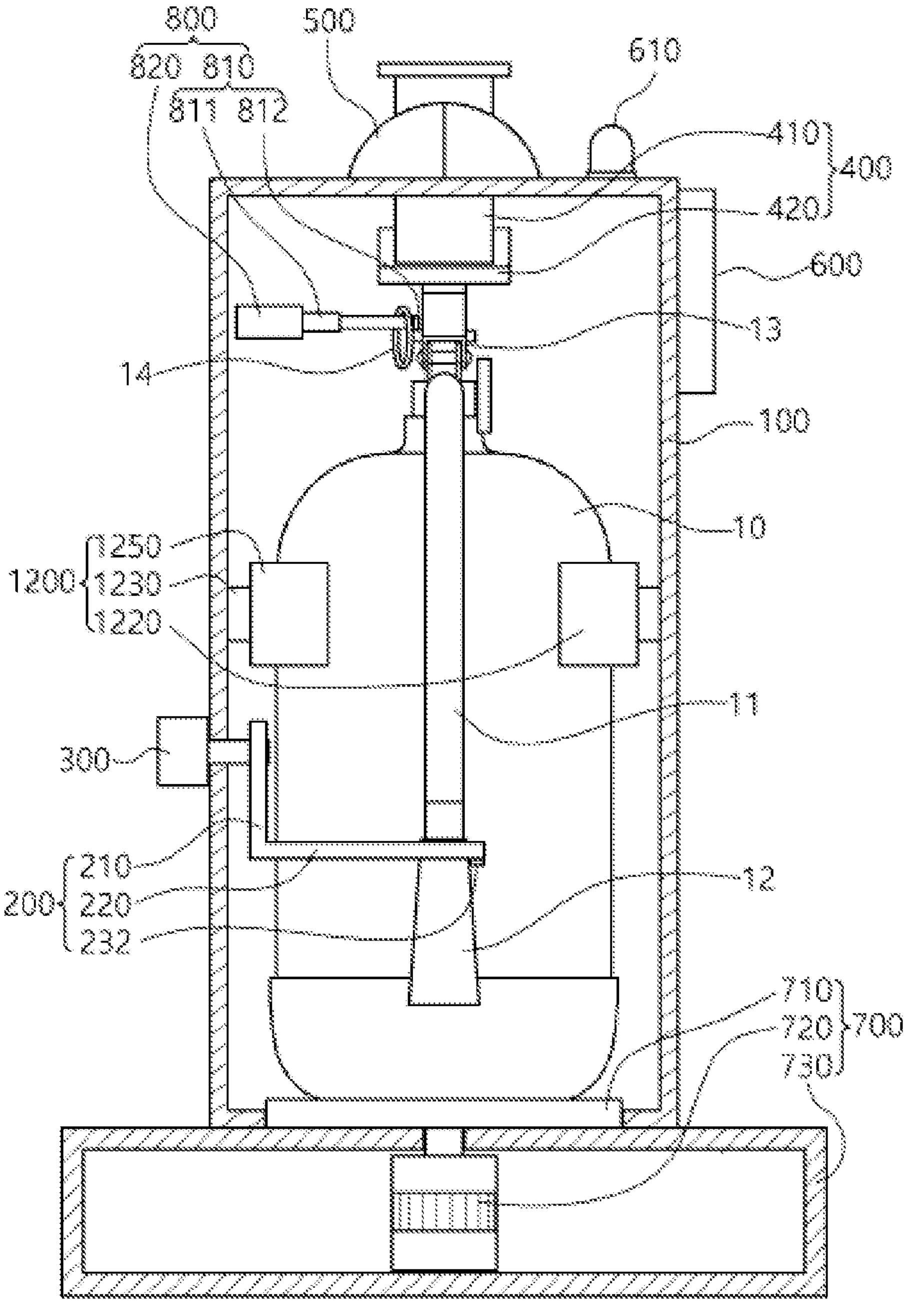
FIG. 5 is a front view illustrating a cobra automatic fire extinguishing device capable of loading a fire extinguisher according to another embodiment of the present invention.

FIG. 5 is a front view illustrating a cobra automatic fire extinguishing device capable of loading a fire extinguisher according to another embodiment of the present invention. Referring to FIG. 5, the cobra automatic fire extinguishing device capable of loading a fire extinguisher according to another embodiment of the present invention further comprises a fire extinguisher fixing jig part 1200 that holds and fixes the fire extinguisher 10 positioned in the fire extinguisher housing 100.

The fire extinguisher fixing jig part 1200 holds the fire extinguisher 10 inside the fire extinguisher housing 100 to fix its position and prevent an accident that the fire extinguisher 10 is knocked over or moved by an external impact, and the lever 13 is not operated by the lever operating part 400.

In addition, the fire extinguisher fixing jig part 1200 holds the fire extinguisher 10 inside the fire extinguisher housing 100 to fix its position and prevent an accident that the fire extinguisher 10 in the fire extinguisher housing 100 is knocked over or moved and the fire extinguisher 10 is escaped to the outside, by an external impact generated while the fire extinguisher housing 100 moves along the ceiling rail member 900 or the floor rail member 1100.

The fire extinguisher fixing jig part 1200 includes: a first jig member 1250 and a second jig member 1220 respectively positioned on both sides of the fire extinguisher 10, and a jig moving part 1230 moving the first and the second jig member 1250, 1220 in a direction in which the distance between the first and the second jig member 1250, 1220 becomes narrow or wide.

Each of the first and the second jig member 1250, 1220 has a V-shaped groove portion into which a portion of the body of the fire extinguisher 10 is inserted, respectively, so that the fire extinguisher 10 of different sizes can be stably held and fixed.

In addition, buffer pads (not shown) are respectively positioned on the inclined surfaces forming the V-shaped grooves, so that the first and second jig member 1250, 1220 can more stably hold and fix the fire extinguisher 10, and safely stores the fire extinguisher 10 by absorbing shocks.

Although not shown, the jig moving parts 1230 penetrates through and coupled to the first and the second jig member 1250, 1220. In this case, the jig moving part 1230 includes jig moving screws that are screwed in opposite directions, and a screw rotating motor that rotates the jig moving screws in both directions.

The first and the second jig member 1250, 1220 respectively screwed to the jig moving screws in opposite directions move in opposite directions by the rotation of the screw rotating motor.

Therefore, the first and the second jig member 1250, 1220 moves in a direction in which the distance between them becomes narrow by the rotation of the screw rotating motor, to hold and fix the body of the fire extinguisher 10. On the other hand, the first and the second jig member 1250, 1220 moves in a direction in which the distance between them becomes wide to draw the fire extinguisher 10 from the fire extinguisher housing 100, or to mount the fire extinguisher 10 on the fire extinguisher housing 100.

Figure 6:
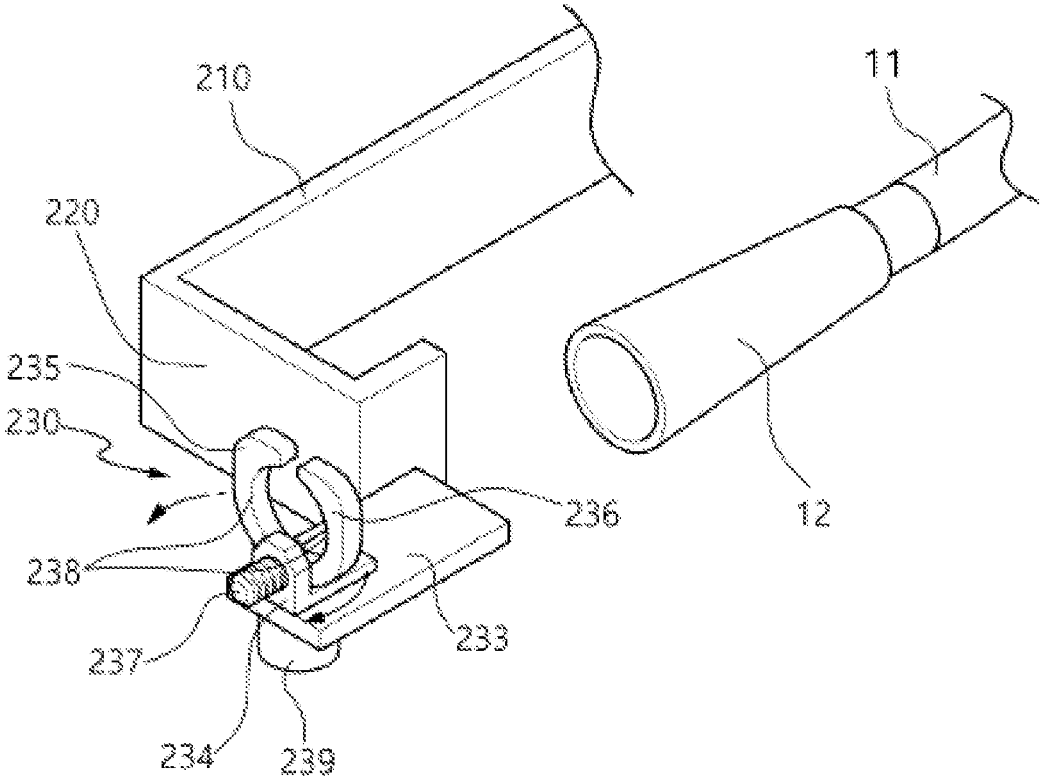
FIG. 6 is a partial perspective view illustrating a nozzle fixing part of a cobra automatic fire extinguishing device capable of loading a fire extinguisher according to another embodiment of the present invention.

FIG. 6 is a partial perspective view illustrating a nozzle fixing part 200 of a cobra automatic fire extinguishing device capable of loading a fire extinguisher according to another embodiment of the present invention.

Referring to FIG. 6, the clamping part 230 includes: a base bracket 233 positioned at the end portion of the nozzle fixing bracket 220; a hinge fixing bracket 234 positioned to be stood upright on the base bracket 233; a first jig bracket 235 rotatably coupled to the hinge fixing bracket 234 and having a first nozzle insertion groove into which a portion of the nozzle 12 is inserted; a second jig bracket 236 rotatably coupled to the hinge fixing bracket 234 and having a second nozzle insertion groove into which the remaining portion of the nozzle is inserted, and a jig rotating part 237 mounted on the hinge fixing bracket 234 and rotating the first and the second jig bracket 235, 236 to widen or narrow the distance between the first and the second jig bracket 235, 236.

Each of the first and the second nozzle insertion groove is formed in a semi-circular shape to surround and fix the cone-shaped nozzle 12. In addition, a nozzle buffer member 238 made of elastic material is positioned on the inner surface of the first and the second nozzle insertion groove, respectively, so that the first and the second jig bracket 235, 236 can hold and fix the nozzle 12 in more stably way.

A jig rotating part 237 includes a nozzle jig rotating motor (not shown) to rotate the first and the second jig bracket 235, 236 to opposite sides with respect to the hinge fixing bracket 234. The jig rotating part 237 may be variously modified using a known structure that can widen or narrow the distance between the first and the second jig bracket 235, 236.

In one embodiment, the jig rotating part 237 includes a jig rotating screw (not shown) that is screwed to the first and the second jig bracket 235, 236 in opposite directions and rotates by a nozzle jig rotating motor.

The jig rotating part 237 respectively rotates the first and the second jig bracket 235, 236, and thus, the nozzle 12 can be clamped or released simply and quickly. Accordingly, the jig rotating part 237 greatly improves user convenience when installing or separating the fire extinguisher 10.

For example, when a user directly holds the fire extinguisher 10 and uses it manually, the distance between the first and second jig brackets 235, 236 is automatically widened by the jig rotating part 237, and thus, the clamping state of the nozzle 12 can be released quickly.

In addition, the clamping part 230 further includes a nozzle horizontal rotating part 239 that is positioned in the base bracket 233 and rotates the hinge fixing bracket 234 left and right to adjust the spraying direction of the nozzle 12.

Specifically, the nozzle horizontal rotating part 239 can adjust the spraying direction of the nozzle 12, which is fixed between the first and the second jig bracket 235, 236, by horizontally rotating the nozzle 12 left and right. Accordingly, the spraying direction of the nozzle 12 can be more accurately directed to the location of the fire.

As described above, the cobra automatic fire extinguishing device capable of loading a fire extinguisher according to the embodiment can automatically spray extinguishing fluid to the location of a fire by mounting a fire extinguisher thereon. In addition, the cobra automatic fire extinguishing device can be installed economically since it does not require additional cost for manufacturing a separate, dedicated fire extinguisher and extra time for the certification procedure.

In addition, the cobra automatic fire extinguishing device capable of loading a fire extinguisher according to the embodiment can precisely spray the extinguishing liquid at the location of a fire and can spray over a wide range, by rotating the mounted fire extinguisher or moving the nozzle up and down without rotating the mounted fire extinguisher. Accordingly, the cobra automatic fire extinguishing device can effectively extinguish the fire and prevent conflagration by suppressing the initial fire.

Furthermore, the cobra automatic fire extinguishing device capable of loading a fire extinguisher according to the embodiment can manually operate the mounted fire extinguisher to spray the extinguishing liquid to the location of the fire, thereby providing user convenience and efficiently suppressing the fire.

The cobra automatic fire extinguishing device capable of loading a fire extinguisher according to the embodiment can communicate with a control center that is installed separately from the control part 600 and can control the cobra automatic fire extinguishing device through wired or wireless communication. The communication may use wireless communication networks, such as 3G, 4G, 5G, LTE, LTE-A, LTE-M, NB-IOT, RF, Wireless Broadband Internet, and Wi-Fi, Zigbee, PLC, BLE, JLC, Web, SNS (Social Network Service), and the like.

The cobra automatic fire extinguishing device capable of loading a fire extinguisher according to the embodiment can be mounted and operated on an unmanned aerial vehicle, such as a tracked robot vehicle or a drone. In addition, the cobra automatic fire extinguishing device capable of loading a fire extinguisher can be more actively used for monitoring, alarming, and extinguishing of initial fires in public buildings, factories, large structures, and vessels.

In the cobra automatic fire extinguishing device capable of loading a fire extinguisher according to the embodiment, a general commercial fire extinguisher can be mounted, but certain fire extinguishers, which are manufactured by changing the shape and design of the general fire extinguisher, can be separately manufactured and mounted. In this case, the equipment and devices equipped in the cobra automatic fire extinguishing device may be modified to be used. In addition, the automatic operation procedure for the fire occurrence can be shortened or extended. In some embodiments, two or more fire extinguishers may be mounted on and operated in the fire extinguisher housing 100, by using a conveyor device and a method of injecting a fire extinguisher.

The cobra automatic fire extinguishing device capable of loading a fire extinguisher according to the embodiment may be equipped with camera devices, such as a IoT camera, an infrared camera, a thermal imaging camera, and a real-time camera; a control part equipped with a variety of sensors and measuring devices, and a fire information cloud system that has learned in advance a variety of fire disaster situations, such as flame, spark, explosion, fume, gas, and noise generated during a fire. The cobra automatic fire extinguishing device capable of loading a fire extinguisher can realize and judge the initial fire situation based on various sensor measurement values and fire image information, which are identified through calculation and communication with various kinds of devices mounted thereon. Accordingly, the cobra automatic fire extinguishing device capable of loading a fire extinguisher can automatically respond to fire situations and work for fire locations.

Although preferred embodiments of the present invention have been described in detail above, the scope of the present invention is not limited thereto. The scope of the present invention includes the basic concept of the present invention defined in the appended claims, and modifications and improvements made by one skilled in the art using the basic concept.

What is claimed is:

1. A cobra automatic fire extinguishing device capable of loading a fire extinguisher that adjusts a nozzle of a mounted fire extinguisher toward a location of a fire to spray extinguishing liquid, the cobra automatic fire extinguishing device comprising:
- a fire extinguisher housing having an open front and accommodating the fire extinguisher inside;
- a nozzle fixing part rotatably disposed inside the fire extinguisher housing and clamping the nozzle of the fire extinguisher;
- a nozzle rotating part disposed inside the fire extinguisher housing and rotating the nozzle fixing part so that the nozzle faces toward the location of the fire;
- a lever operating part positioned in the fire extinguisher housing and operating the fire extinguisher by pressing a lever of the fire extinguisher;
- a fire detector positioned in the fire extinguisher housing and detecting the fire, and
- a control part receiving a fire signal from the fire detector and controlling operations of the nozzle rotating part and the lever operating part.

2. The cobra automatic fire extinguishing device of claim 1, wherein the nozzle fixing part includes:
- a side rotating bracket rotatably positioned on an internal side of the fire extinguisher housing and connected to the nozzle rotating part;
- a nozzle fixing bracket positioned to be bent from an end portion of the side rotating bracket and clamping the nozzle, and
- a clamping part positioned on the nozzle fixing bracket and fixing the nozzle.

3. The cobra automatic fire extinguishing device of claim 2, wherein the fire extinguisher housing has a top portion formed with a slit groove into which the side rotating bracket can be inserted,
- wherein the nozzle fixing bracket is positioned not to block the fire extinguisher when the fire extinguisher is inserted into the fire extinguisher housing through the open front of the fire extinguisher housing, by lifting the side rotating bracket upward to pass through the slit groove and be exposed above the top portion of the fire extinguisher housing.

4. The cobra automatic fire extinguishing device of claim 2, wherein the clamping part include:
- a nozzle fitting groove positioned at an end portion of the nozzle fixing bracket and having an open portion at one side, and
- a groove opening and closing part positioned at the end portion of the nozzle fixing bracket, and opening or closing the open portion of the nozzle fitting groove.

5. The cobra automatic fire extinguishing device of claim 2, wherein the clamping part includes:
- a base bracket positioned on an end portion of the nozzle fixing bracket;
- a hinge fixing bracket positioned to stand upright on the base bracket;
- a first jig bracket rotatably coupled to the hinge fixing bracket and having a first nozzle insertion groove into which a portion of the nozzle is inserted;
- a second jig bracket rotatably coupled to the hinge fixing bracket and having a second nozzle insertion groove into which a remaining portion of the nozzle is inserted, and
- a jig rotating part mounted on the hinge fixing bracket and rotating the first and the second jig bracket to widen or narrow a distance between the first and the second jig bracket.

6. The cobra automatic fire extinguishing device of claim 5, wherein each of the first and the second nozzle insertion groove is formed in a semi-circular shape to surround and fix the nozzle having a cone shape,
- wherein a nozzle buffer member made of elastic material is positioned on an inner surface of each of the first and the second nozzle insertion groove.

7. The cobra automatic fire extinguishing device of claim 5, wherein the clamping part further includes a nozzle horizontal rotating part that is positioned in the base bracket and rotates the hinge fixing bracket left and right to adjust a spraying direction of the nozzle.

8. The cobra automatic fire extinguishing device of claim 1, further comprising a fire extinguisher rotating part that rotates the fire extinguisher positioned inside the fire extinguisher housing.

9. The cobra automatic fire extinguishing device of claim 8, wherein the fire extinguisher rotating part is rotatably positioned on a bottom portion of the fire extinguisher housing, and includes:
- a rotating plate member on which the fire extinguisher is mounted, and
- a rotating motor rotating the rotating plate member.

10. The cobra automatic fire extinguishing device of claim 9, wherein the fire extinguisher rotating part further includes a housing support member on which the fire extinguisher housing is rotatably positioned, and the fire extinguisher housing is rotated by the rotating motor.

11. The cobra automatic fire extinguishing device of claim 10, wherein the rotating plate member includes a ratchet structure that allows the rotating plate member to rotate separately from the fire extinguisher housing when rotating in one of a clockwise direction and a counterclockwise direction, and to rotate integrally with the fire extinguisher housing when rotating in the other one of the clockwise direction and the counterclockwise direction.

12. The cobra automatic fire extinguishing device of claim 8, further comprising a safety pin removing part that pulls out a safety pin disposed on the fire extinguisher and locks an operation of the lever of the fire extinguisher.

13. The cobra automatic fire extinguishing device of claim 12, wherein the safety pin removing part includes:
- a safety pin engaging hook member by which the safety pin is hooked, and
- a pin moving device removing the safety pin from the fire extinguisher by pulling the safety pin engaging hook member.

14. The cobra automatic fire extinguishing device of claim 13, wherein the safety pin engaging hook member has a structure that is adjusted in length.

15. The cobra automatic fire extinguishing device of claim 12, wherein the control part receives information of the location of the fire from the fire detector, controls operations of the safety pin removing part, the nozzle rotating part, the fire extinguisher rotating part, and the lever operating part, and sprays the extinguishing liquid with the nozzle which is in a state of facing toward the location of the fire.

16. The cobra automatic fire extinguishing device of claim 12, wherein the fire detector includes an infrared camera or a fire detection IoT camera that captures images around the fire extinguisher housing and detects the fire.

17. The cobra automatic fire extinguishing device of claim 16, wherein the fire detector includes any one fire detection sensor selected among the group of a combustible gas detection sensor, a toxic gas detection sensor, a complex gas concentration measurement sensor, a gas detection measurement sensor, and any one of these combinations thereof.

18. The cobra automatic fire extinguishing device of claim 1, wherein the fire detector includes any one fire detection sensor selected among the group of a combustible gas detection sensor, a toxic gas detection sensor, a complex gas concentration measurement sensor, a gas detection measurement sensor, and any one of these combinations thereof.

19. The cobra automatic fire extinguishing device of claim 1, further comprising:
- a rail member positioned so that the fire extinguisher housing is movable and installed on at least one of a ceiling, a floor, and a wall of a building, and
- a housing driving part positioned on the fire extinguisher housing and moving the fire extinguisher housing along the rail member.

20. The cobra automatic fire extinguishing device of claim 19, further comprising an external fire detection part that is located in a moving route of the fire extinguisher housing in the building to detect the fire.

21. The cobra automatic fire extinguishing device of claim 20, wherein the control part further includes a wireless communication part that communicates with the external fire detection part and transmits information of the fire to the control part.

22. The cobra automatic fire extinguishing device of claim 1, further comprising a fire extinguisher fixing jig part that holds and fixes the fire extinguisher positioned inside the fire extinguisher housing.

23. The cobra automatic fire extinguishing device of claim 22, wherein the fire extinguisher fixing jig part includes:
- a first jig member and a second jig member respectively positioned on both sides of the fire extinguisher, and
- a jig moving part moving the first and the second jig member in a direction in which a distance between the first and the second jig member becomes narrow or wide,
- wherein each of the first and the second jig member has a V-shaped groove portion into which a portion of the body of the fire extinguisher is inserted, respectively,
- wherein buffer pads are respectively positioned on inclined surfaces that forms the V-shaped grooves.

24. The cobra automatic fire extinguishing device of claim 1, wherein the control part includes a fire alarm lamp part and a fire alarm speaker part that notify the fire to outside when the fire signal is transmitted from the fire detector.

25. The cobra automatic fire extinguishing device of claim 1, wherein the control part is connected to a broadcasting system in a building, and when the fire signal is transmitted from the fire detector, the control part outputs an alarm sound or an evacuation voice announcement through the broadcasting system in the building.

26. The cobra automatic fire extinguishing device of claim 1, wherein the control part further includes an automatic voice reporting function that automatically reports the fire to a manager or a fire department by voice.

* * * * *